United States Patent [19]

Demiryont

[11] Patent Number: 4,830,471
[45] Date of Patent: May 16, 1989

[54] ELECTROCHROMIC MATERIAL, METHOD OF MAKING, AND NEW ELECTROCHROMIC DEVICE

[75] Inventor: Hulya Demiryont, Dearborn, Mich.

[73] Assignee: Ford Motor Company, Dearborn, Mich.

[21] Appl. No.: 137,633

[22] Filed: Dec. 24, 1987

[51] Int. Cl.$^4$ .......................... G02F 1/01; G02F 1/17
[52] U.S. Cl. .................................................. 350/357
[58] Field of Search ...................... 350/357, 356, 353

[56] References Cited

U.S. PATENT DOCUMENTS

| | | | |
|---|---|---|---|
| 3,521,941 | 7/1970 | Deb et al. | 350/357 |
| 3,943,528 | 3/1976 | Camphausen | 346/165 |
| 4,175,838 | 11/1979 | Randin | 350/357 |
| 4,294,520 | 10/1981 | Inoue et al. | 350/357 |
| 4,326,777 | 4/1982 | Kohara et al. | 350/357 |

Primary Examiner—Eugene R. LaRoche
Assistant Examiner—Nathan W. McCutcheon
Attorney, Agent, or Firm—Lorraine S. Melotik; Roger L. May

[57] ABSTRACT

This invention teaches uncolored copper oxide as a new electrochromic material. An electrochromic device is constructed from this material by forming either an anodic electrochromic device or a cathodic electrochromic device. A fast ion conductor is also provided which is capable of generating ions when an electric field is applied thereto. The fast ion conductor also permits ion movement therethrough while prohibiting electron movement therethrough. The fast ion conductor and the uncolored copper oxide are arranged between an anode and a cathode to form an electrochromic device. Preferably, the copper oxide is in a layer next to one of the electrodes. If the copper oxide layer is next to the cathode, the device is a cathodic device which can generate a blue color. If the copper oxide layer is next to the anode, the device is an anodic device and can be operated to produce either a pink or a green color depending upon the amount of voltage applied between the anode and the cathode.

17 Claims, 2 Drawing Sheets

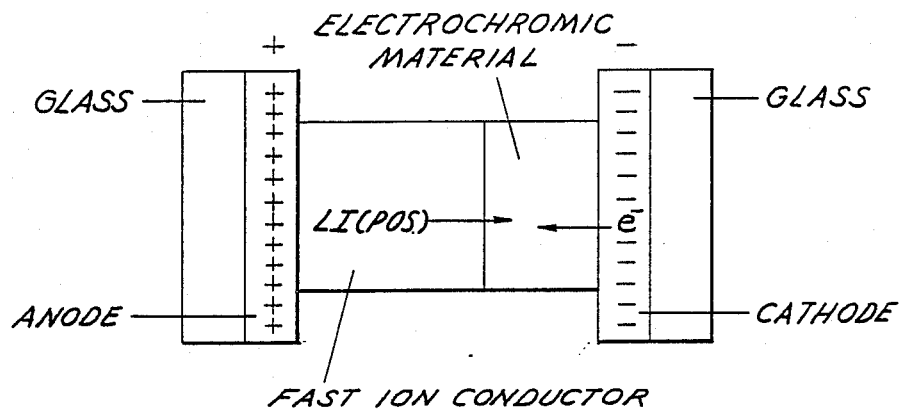
FIG.1 CATHODIC MATERIAL
REDUCTION — GAIN OF ELECTRONS
  LI (POS.) AND e⁻ (NEG.) INCLUSION
OR LI (NEG.) AND HOLE EXTRACTION
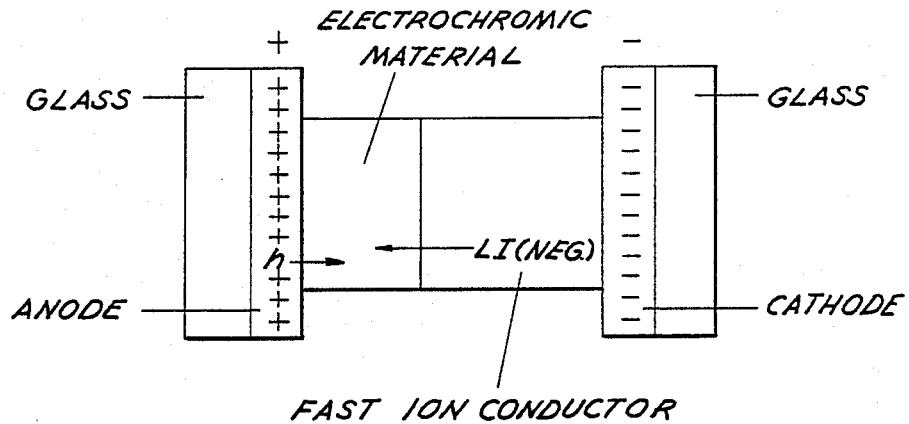
FIG.2 ANODIC MATERIAL
OXIDATION — LOSS OF ELECTRONS
  LI (NEG.) AND HOLE INCLUSION
OR LI (POS.) AND e⁻ (NEG.) EXTRACTION

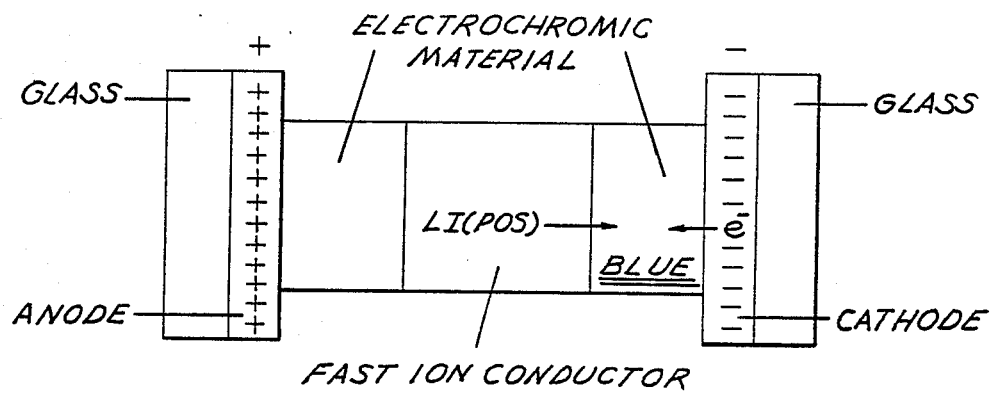
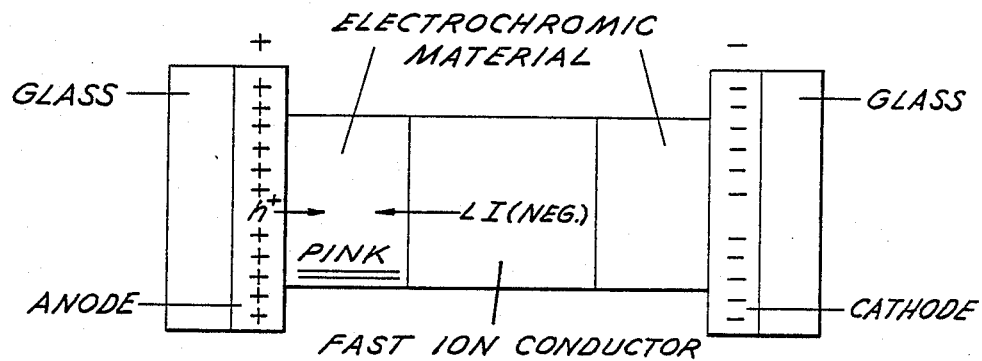
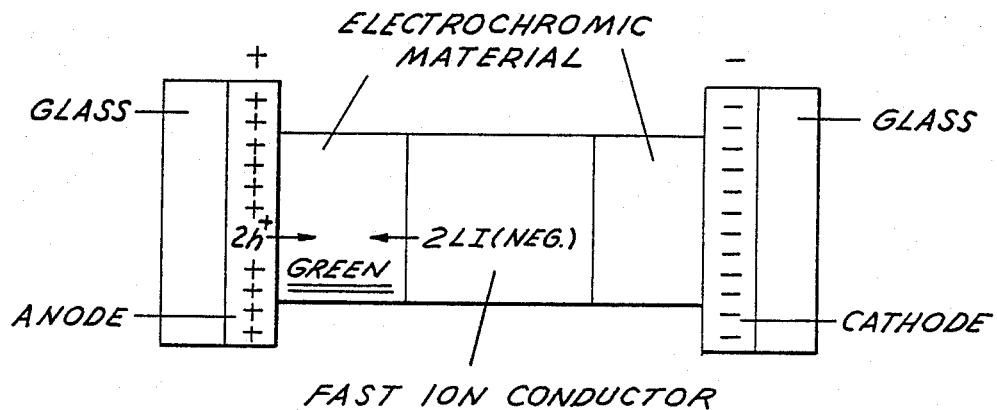

ELECTROCHROMIC MATERIAL, METHOD OF MAKING, AND NEW ELECTROCHROMIC DEVICE

BACKGROUND OF THE INVENTION

1. Field of the Invention

This invention relates to a new electrochromic material, a method of making the new electrochromic material, and an electrochromic device utilizing the new material.

2. Description of the Related Art

In order to better understand my inventive contributions, I will first undertake a general discussion of electrochromic behavior in electrochromic materials. Electrochromism is a coloring phenomenon observed in some materials when they are placed in the presence of an electrical field. Such materials are normally uncolored when no electrical field is present, but change to a colored state when an electrical field is placed thereoaround.

Such a material exhibiting reversible color changes is known as an electrochromic material (ECM). This electrical field dependent transition phenomenon from an uncolored state to a colored state is called optical switching. If a thin coating of such an ECM is placed on a glass support, the entire device is known as a switchable window. When no electrical field is placed on the ECM, it is uncolored and transparent and thus one can look through the window. On the other hand, when an electric field is placed on the ECM, it colors thereby reducing the amount of light transmitted through the window. The reduction of light transmission may be partial or total thereby either reducing the amount of light which passes through the window or eliminating it altogether.

Certain transition metal oxides are known to exhibit electrochromism. Materials such as tungsten oxide, molybdenum oxide, and vanadium oxide are known electrochromic materials.

Electrochromic materials can be divided into two categories depending on the mode of operation of the ECM. The ECM can be either a cathodic ECM or it can be an anodic ECM. The operation of these two types of ECM will be understood by reference to FIGS. 1 and 2.

In FIG. 1, the operation of a cathodic ECM is schematically illustrated. In the cathodic case, an electrochromic material of the cathodic type is physically located next to a cathode which has been placed, for example, on a glass substrate. A fast ion conductor material, which Produces light ions of a positive charge, for example, lithium ions, is placed between the electrochromic material and an anode which also may be placed on a glass substrate.

In the cathodic case, the electrochromic material is subjected to a reduction or gain of electrons when an electric field is applied thereto. Application of the electric field is indicated by the plurality of plus signs shown on the anode and the plurality of negative signs shown on the cathode. As a result of the application of an electric field applied between the anode and the cathode of appropriate strength and sign, positive light ions are driven from the fast ion conductor into the electrochromic material and electrons are supplied to the electrochromic material from the cathode.

The positively charged light ions and the negatively charged electrons associate themselves with the electrochromic material to reduce the same thereby moving the electrochromic material from a base state to a reduced state. In the base state, the electrochromic material is uncolored, but in its reduced state, it is colored.

When the electric field is removed, the electrochromic material will return to its base state, that is, its uncolored state. The period of time required for return of the material to its uncolored state varies from material to material and is generally referred to as the memory of the ECM. Some materials have relatively short memories and others have prolonged memories.

While the operation of the cathodic material has been illustrated by the inclusion in the electrochromic material of positive light ions and negative electrons, the cathodic operation may also take place by the extraction of negative light ions and holes from the electrochromic material respectively to the fast ion conductor and the cathode.

Operation of an anodic ECM is schematically illustrated in FIG. 2. In this case, the electrochromic material is located next to the anode and the fast ion conductor is located between the electrochromic material and the cathode. In the anodic operation, oxidation of the ECM takes place, that is, electrochromism occurs when the ECM loses electrons. The loss of electrons in this case is illustrated by the application of an electric field represented by a plurality of pluses on the anode and the plurality of minuses at the cathode.

In the case of an anodic ECM, when an electric field is applied between the anode and the cathode of appropriate strength and sign, negative light ions, such as hydroxyl ions, move from the fast ion conductor into the ECM, and holes moves into the ECM from the anode. As a result of this movement, the ECM loses electrons thereby being oxidized away from its base or uncolored state to a colored state. Once again, the anodic material will return to its base state when the electric field is released. The time of return to its uncolored state again depends on the memory of the ECM.

The anodic ECM may also operate by extracting from the ECM positive light ions and negative electrons respectively to the fast ion conductor and the anode. In this case, the ECM is also oxidized to a colored state.

In general, in either the cathodic ECM or the anodic ECM, the coloring observed in the material is an electrochemical phenomenon produced by the application of an electric field on the ECM to move it from a base condition to a nonbase condition. By applying a field of required strength and direction to cause activity in the ECM, polarization occurs within the entire electrochromic device. In such polarization, a disassociation of ions occurs in the fast ion conductor creating free light ions of the required charge. These light ions move into the ECM because of the electrical field. Once in the ECM, they bond themselves to the molecules of the ECM.

As has been described above, depending on the charge of the bonding ion and its associated electron or hole, oxidation or reduction of the ECM occurs. These ECM materials are normally multivalent state materials exhibiting different optical absorption and dispersion spectra corresponding to different oxidation states. For these ECM's, these different oxidation and reduction states are all stable under appropriate electric field conditions.

In the base ECM, the metal valance states are generally at the maximum, whereby such metal oxides in their base state exhibit the lowest optical absorption. They are generally good insulators with high energy gaps, optically transparent and colorless in such a condition. On the other hand, oxygen deficient oxides as well as reduced oxides created as a result of the application of an electric field exhibit higher optical absorption than those of base oxides When oxygen deficient, ECM's exhibit a selective absorption when they are in on of their other oxidation states Different ECM exhibit different colors, depending upon the spectral location of the selective absorption bands of that particular oxygen deficient metal oxide.

The explanation so far set forth above of cathodic and anodic ECM is my best explanation. It is possible to reduce this theory of mine to electrochemical equations in which a base ECM, acting as a cathodic material, would be subjected to a reduction by inclusion in the ECM of positive light ions and negative electrons or by extraction from the ECM of negative light ions and holes respectively to the fast ion conductor and the cathode in order to reduce the cathodic ECM to its colored state.

In a similar manner, an electrochemical equation may be written for an anodic ECM in the same manner. In this case, the inclusion of negative light ions and holes in the ECM or the extraction of positive light ions and negative electrons respectively to the fast ion conductor and the anode is sufficient to oxidize the anodic material to a colored state.

I personally conducted a search in the U.S. Patent and Trademark Office on the subject matter of this specification. As a result of that search, I uncovered only one patent which I felt was only remotely associated with the subject matter to be taught as the invention herein. The patent was U.S. Pat. No. 3,521,941, which issued July 28, 1970, for an "Electro-Optical Device Having Variable Optical Density". This patent, in column 4, line 7, mentions copper stannate as a possible electrochromic material.

It is an object of this invention to provide a new electrochromic material.

It is a feature of this invention that a new electrochromic material is provided which can be either an anodic ECM or a cathodic ECM.

It is an advantage of this invention that a newly provided ECM having both anodic and cathodic capabilities can be switched between an uncolored state and three distinct and different color states.

It is another object of this invention to provide an electrochromic device having a new ECM therein.

It is another feature of this invention that a electrochromic device can be constructed with a newly provided ECM having both anodic and cathodic capabilities, whereby the electrochromic device can be used as either an anodic electrochromic device or a cathodic electrochromic device, or both.

It is another advantage of this invention that an electrochromic device can be constructed using a newly provided ECM having both anodic and cathodic capabilities, whereby the electrochromic device can be switched between an uncolored state and three distinct and different color states.

DISCLOSURE OF THE INVENTION

This invention is directed to a new electrochromic material. In particular, this invention is directed to a new electrochromic material comprising uncolored copper oxide. An exact definition of what constitutes uncolored copper oxide will be given in a later portion of this specification when sufficient information has been given so that the definition can be understood.

The invention is also directed to an electrochromic device. The electrochromic device comprises an anode, a cathode, a fast ion conductor capable of generating ions when an electric field is applied thereto, the fast ion conductor also permitting ion movement therethrough while prohibiting electron movement therethrough, and uncolored copper oxide. The fast ion conductor and the copper oxide are arranged between the anode and the cathode.

In a preferred embodiment of the inventive electrochromic device, the uncolored copper oxide is in a layer. When the layer of copper oxide is located adjacent the cathode, the electrochromic device is a cathodic device which operates by reduction of the copper oxide when an electric field is applied thereto. When the copper oxide layer is located adjacent the anode, the electrochromic device is an anodic device which operates by oxidation of the copper oxide layer when an electric field is applied thereto.

When the electrochromic device is operated as a cathodic device, and a voltage of about minus two volts is applied between the anode and the cathode, a blue color is produced in the electrochromic device.

When the electrochromic device is operated as an anodic device, and a voltage of about plus two volts is applied between the anode and the cathode, the electrochromic device produces a pink color.

When the electrochromic device is operated as an anodic device, and a voltage of about plus four volts is applied between the anode and the cathode, the electrochromic device produces a green color.

The invention also is a method of making an uncolored copper oxide electrochromic device In this method, copper oxide is applied to one of the electrodes of the device by thermally evaporating black copper oxide (CuO) in a vacuum of about $10^{-4}$ torr. The CuO is spaced from the electrode it is to coat by a distance of about 5cm. In such a manner, uncolored copper oxide is applied to the selected electrode at a rate of thickness build up of from 100 angstroms to 300 angstroms per minute, preferably 200 angstroms per minute. The uncolored copper oxide coating on the electrode, in accordance with the teachings of a preferred embodiment of the invention, is applied to a thickness in a range of 3000–5000 angstroms, preferably about 4000 angstroms.

BRIEF DESCRIPTION OF THE DRAWINGS

The novel features that are considered characteristic of the invention are set forth with particularity in the appended claims. The invention itself, however, both as to its organization and its method of operation, together with additional objects, features and advantages thereof, will best be understood from the following description of specific embodiments when read in connection with the accompanying drawings in which:

FIGS. 1 and 2, as previously discussed, are schematic illustrations respectively of the operation of a cathodic electrochomic material add of an anodic electrochromic material.

FIG. 3, 4 and 5 are schematic illustrations of different operational modes of an electrochromic device in accordance with this invention in which the electrochromic material is uncolored copper oxide which may be used as either a cathodic ECM or an anodic ECM.

DESCRIPTION OF THE PREFERRED EMBODIMENTS

The following description is what I consider to be the preferred embodiments of my invention. The following description also sets forth what I now contemplate to be the best mode of construction for an inventive electrochromic device. The description is not intended to be a limitation upon the broader principles of this invention.

FIGS. 3 through 5 schematically illustrate the change of uncolored copper oxide into either a cathodic ECM or into two different states of an anodic ECM, each of the different states having a distinct color This invention, of course, relates to an electrochromic device fabricated using as a new electrochromic material, uncolored copper oxide This new ECM can alternatively and stably exhibit different oxidation states and different colors in those respective oxidation states, the color depending upon the intensity of an electric field applied across the material. The uncolored copper oxide may be used both as a cathodic ECM, as will be discussed in conjunction with FIG. 3, or in one or the other of two different states as an anodic ECM, which will be discussed respectively in conjunction with FIGS. 4 and 5.

Reference is now made to FIG. 3. In this situation, a cathodic ECM is disclosed. A first glass sheet has an anode thereon and a second glass sheet has a cathode thereon. In both cases, in accordance with the preferred embodiment of my invention, the glass sheets have a thickness of ⅛ inch and the electrodes have a thickness of about 2000 angstroms. In accordance with the teachings of the preferred embodiment, both the anode and the cathode are formed from tin oxide doped with fluorine. Such a coating may be applied to the glass sheet by a pyrolytic process, as is well-known in the art. It is, of course, apparent that other electrode materials may be used and other materials may be substituted for the glass sheets, for example, quartz, plastic, etc. Generally, one of the electrode supports should be transparent so that the colors developed in the electrochromic material may be viewed As shown in FIG. 3 in the preferred embodiment, electrochromic material is positioned both adjacent the cathode and the anode. In the situation discussed with respect to FIG. 3, only the material adjacent the cathode is necessary and only this material will be colored, as this figure is showing the uncolored copper oxide as a cathodic ECM.

In accordance with the teachings of a preferred embodiment of the method of this invention, uncolored copper oxide material exhibiting good electrochromism is deposited on the electrode by thermal evaporation of black copper powder. Black copper powder is available from many sources. For example, General Chemical Division of Allied Chemical sells this powder as cupric oxide powder, Code 1645.

The black copper powder to form the electrochromic material was loaded in a tantalum boat which was then heated to a temperature below the evaporation temperature of the black copper oxide. The thermal evaporation was carried out at a pressure of approximately $10^{-4}$ torr of vacuum. The black copper oxide powder and the electrode to be coated were spaced from one another by a distance of about 5cm. In this manner, the uncolored copper oxide is applied to the electrodes at a rate of thickness build up of about 100–300 angstroms per minute, generally controlled to a rate of about 200 angstroms per minute. The coating of uncolored copper oxide was built up to a thickness of approximately 4000 angstroms. A suitable range is 3000–5000 angstroms thickness for the uncolored copper oxide. It is, of course, obvious that the thicker the coating, the less transmission of visible light will occur therethrough when the ECM is moved to its colored state.

The required fast iron conductor is basically two materials. The first material is one which will produce the required light ions and the other is a material which will support the ion producing material, will permit ion movement through the material, and will prohibit electron movement therethrough.

A great number of ion source materials are available, such as LiCl, LiI, AgCl, NaI, NaBr. Of these many materials, and there are a good number more, LiCl was selected because it is preferable due to the high mobility of its ions, their small ionic radius and high discharge voltage.

The material for supporting the ion producing material in accordance with the teachings of the preferred embodiment is polyvinylbutyral. A gel form of polyvinylbutyral is weather-resistant, electrochemically stable, optically nonabsorbing, and capable of being dissolved in a solvent. Additionally, the polyvinylbutyral exhibits good adhesive properties in binding a surface to itself. There are other materials, such as polymers, polyvinylacetate, urethane and acrylics, that exhibit such properties.

In order to prepare the fast ion conductor, the preferred polyvinylbutyral and LiCl was dissolved in a suitable solvent. The solvent should have a high boiling point, high ionic conductivity, high electronic resistivity, and be useful over a range of temperatures. I selected glycol ether DPM as the Preferred solvent. 10% by weight polyvinylbutyral and 90% by weight glycol ether DPM were mixed together. Thereafter, finely divided LiCL was added to the mixture until the resistivity of the medium was reduced to approximately 500 ohm-per-centimeter. The fast ion conductor gel was then sandwiched, as shown in FIG. 3, between the two electrochromic layers. The fast ion conductor had a thickness of approximately 0.1mm.

It should be stated here that by "uncolored copper oxide" I mean a layer of copper oxide which is transparent after it has been laid down. If the layer of copper oxide, as deposited by a selected depositing method, has a colorish cast to it, it will not work as a suitable electrochromic material. Thus, while I have illustrated a preferred method of obtaining the uncolored copper oxide, there will be many other ways of obtaining an uncolored copper oxide which exhibits electrochromism. If the method selected for placing the copper oxide is one which develops a layer of copper oxide having a color cast to it, then it is not a suitable method for applying the copper oxide layer which must be uncolored. In the specification and claims, the wording "uncolored copper oxide" means an uncolored copper oxide material developed by any process whatsoever which provides an uncolored copper oxide rather than a colored or tinted copper oxide on a suitable support.

In FIG. 3, a cathodic electrochromic device i illustrated. In this case, when a voltage of minus two volts is applied between the anode and the cathode of the electrochromic device, positive light ions move from the fast ion conductor into the electrochromic material located adjacent the cathode. At the same time, electrons moves from the cathode into the electrochromic material locate thereagainst. As a result, the electrochromic material is reduced from its base or uncolored state by gaining electrons and it now takes on a different oxidation state from its uncolored state resulting in a blue coloring of the electrochromic material. In the preferred embodiment, the positive light ions which are moved into the electrochromic material are lithium ions. Since the fast ion conductor is one which permits ion movement therethrough while prohibiting electron movement therethrough, an electric field is built up across the electrochromic device as is indicated by a plurality of pluses shown at the anode and a plurality of minuses shown at the cathode.

The electrochromic material may be returned to its uncolored or base state by removing the two volt negative charge between the anode and the cathode. The decay of the color in the copper oxide system is rather rapid because the material has a very short memory.

In FIG. 4, there is schematically illustrated a condition of the electrochromic device of the invention when a positive two volt charge is applied between the anode and the cathode. In this case, the electrochromic device acts as an anodic device. As shown in FIG. 4, negative light ions, in this case chlorine ions, move from the fast ion conductor into the electrochromic material located adjacent the anode. The anode contributes holes therefrom which also move into the electrochromic material located thereagainst. In such case, oxidation of the electrochromic material from its uncolored or base state takes place which produces a change in the oxidation state of the copper oxide. As a result in this particular change in the oxidation state, the electrochromic material now produces a pink color.

Reference is now made to FIG. 5, which indicates what occurs when a potential of Plus four volts is applied between the anode and the cathode. Once again, this positive voltage application brings about an anodic operation of the electrochromic material. This operation is signified by indicating that additional negative light ions move into the electrochromic material located adjacent the anode while additional holes are contributed from the anode to the electrochromic material. This, once again, results in a further oxidation of the electrochromic material, copper oxide, to a different oxidation state which results in a green color being produced by the electrochromic material.

In summary, it is apparent that uncolored copper oxide may be used to form electrochromic cells of either the cathodic or anodic variety. With respect to the cell of cathodic variety, a voltage of minus two volts applied between the anode and the cathode of the electrochromic device will result in the coloration of the copper oxide as a blue electrochromic material. On the other hand, anodic use of copper oxide will result in a pink color when a positive two volts is applied between the anode and cathode of the electrochromic device or a green color when a plus four volts is applied between the anode and the cathode of the electrochromic device.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention. For example, the uncolored copper oxide, and the fast ion conductor made be mixed together to form a single layer. Also, if one desires to make a dominating cathodic device or anodic device, one may include additional anodic or cathodic electrochromic material in with the copper oxide electrochromic material.

I claim:

1. A new electrochromic material comprising uncolored copper oxide made by a method which comprises heating black copper oxide (CuO) in a vacuum at a temperature below the evaporation temperature of said black copper oxide for a time sufficient to convert said black copper oxide to uncolored copper oxide.

2. An electrochromic device comprising:
   an anode,
   a cathode,
   a fast ion conductor capable of generating ions when an electrical field is applied thereto, said fats ion conductor permitting ion movement therethrough while prohibiting electron movement therethrough, and
   uncolored copper oxide made by a method which comprises heating black copper oxide (CuO) in a vacuum at a temperature below the evaporation temperature of said black copper oxide for a time sufficient to convert said black cooper oxide to uncolored copper oxide,
   said fast ion conductor and said uncolored copper oxide being arranged between said anode and said cathode.

3. The electrochromic device of claim 2 wherein: said fast ion conductor and said uncolored copper oxide form a single layer.

4. The electrochromic device of claim 3 wherein: additional electrochromic materials are included between said anode and said cathode.

5. An electrochromic device comprising:
   an anode,
   a cathode,
   a fast ion conductor capable of generating ions when an electrical field is applied thereto, said fast ion conductor permitting ion movement therethrough while prohibiting electron movement therethrough, and
   a layer of uncolored copper oxide, said uncolored copper oxide being made by a method which comprises heating black copper oxide (CuO) in a vacuum at a temperature below the evaporation temperature of said black copper oxide for a time sufficient to convert said black copper oxide to uncolored copper oxide,
   said fast ion conductor and said uncolored copper oxide layer being arranged between said anode and said cathode.

6. The electrochromic device of claim 5 wherein: additional electrochromic materials are included in said layer of uncolored copper oxide.

7. The electrochromic device of claim 5 wherein: said copper oxide layer is located adjacent said cathode whereby said electrochromic device is a cathodic device which operates by reduction of said copper oxide layer when an electrical field is applied thereto.

8. The electrochromic device of claim 5 wherein: said copper oxide layer is located afjacent said anode whereby said electrochromic device is an anodic device which operates by oxidation of said copper oxide layer when an electrical field is applied thereto.

9. A method of producing a blue color in an electrochromic device by applying a voltage of about $-2$ volts between said anode and said cathode of the electrochromic device defined in claim 7.

10. A method of producing a pink color in an electrochromic device by applying a voltage of about 2 +volts between said anode and said cathode of the electrochromic device defined in claim 8

11. A method of producing a green color in an electrochromic device by applying a voltage of about 4 +volts between said anode and said cathode of to the electrochromic device defined in claim 8.

12. A method of making an uncolored copper oxide electrochromic device which comprises:
    heating black copper oxide (CuO) in a vacuum at a temperature below the evaporation temperature of said black copper oxide for a time sufficient to convert said black copper oxide to uncolored copper oxide, and
    applying said uncolored copper oxide to one of the electrodes of said device by thermally evaporating said uncolored copper oxide in a vacuum of about $10^{-4}$ torr and with said uncolored copper oxide and said one of said electrodes being from one another by a distance of about 5cm whereby said uncolored copper oxide is applied to said one of said electrodes at a rate of thickness build up of from 100Å to 300Å per minute.

13. The method of making an uncolored copper oxide electrochromic device as defined in claim 12 wherein: said uncolored copper oxide is applied at a rate of thickness build up at 200Å per minute.

14. The method of making an uncolored copper oxide electrochromic device as defined in claim 12 wherein: said uncolored copper oxide is applied to a thickness in a range from 3000Å to 5000Å.

15. The method of making an uncolored copper oxide electrochromic device as defined in claim 12 herein: said uncolored copper oxide is applied to a thickness of about 4000Å.

16. An electrochromic device comprising:
    an anode,
    a cathode, and
    an electrochromic layer interposed between said anode and said cathode, said electrochromic layer comprising uncolored copper oxide having a thickness in the range from 3000Å to 5000Å, said uncolored copper oxide being made by a method which comprises heating black copper oxide (CuO) in a vacuum at a temperature below for a time sufficient to convert said black copper oxide to uncolored copper oxide.

17. A method of making an uncolored copper oxide electrochromic device which comprises:
    heating black copper oxide (CuO) in a vacuum at a temperature below the evaporation temperature of said black copper oxide for a time sufficient to convert said black copper oxide to uncolored copper oxide, and
    applying said uncolored copper oxide to one of the electrodes of said device by thermally evaporating said uncolored copper oxide in a vacuum onto said electrode.

* * * * *